United States Patent [19]

Scott

[11] 4,213,892

[45] Jul. 22, 1980

[54] PROCESS FOR PREPARING OXIDATIVELY-STABLE POLYMERS BY REACTION WITH ANTIOXIDANT IN THE PRESENCE OF FREE RADICAL

[76] Inventor: Gerald Scott, 338 Station Rd., Knowle, Warwickshire, England

[21] Appl. No.: 555,678

[22] Filed: Mar. 5, 1975

[30] Foreign Application Priority Data

Mar. 6, 1974 [GB] United Kingdom ............... 10086/74
Jul. 11, 1974 [GB] United Kingdom ............... 30870/74

[51] Int. Cl.$^2$ .............................................. C08K 5/05
[52] U.S. Cl. .................. 260/45.95 C; 260/45.95 G; 260/45.95 F; 525/55; 525/350; 525/384
[58] Field of Search ............... 260/79.5 NV, 45.7 S, 260/45.95; 526/30

[56] References Cited

U.S. PATENT DOCUMENTS

| | | | |
|---|---|---|---|
| 2,543,844 | 3/1951 | Fryling | 260/79.5 NV |
| 2,984,648 | 5/1961 | Williams et al. | 260/45.95 R |
| 3,361,713 | 1/1968 | Meyer et al. | 260/45.7 S |
| 3,650,300 | 3/1972 | Listner | 260/45.7 R |
| 3,660,352 | 5/1972 | Song | 260/45.95 C |
| 3,825,523 | 7/1974 | Iwata et al. | 260/79.5 NV |

FOREIGN PATENT DOCUMENTS

42-9015 of 1967 Japan ............................... 260/45.75 R

*Primary Examiner*—Joseph L. Schofer
*Assistant Examiner*—Peter F. Kulkosky
*Attorney, Agent, or Firm*—Cushman, Darby & Cushman

[57] ABSTRACT

Polymers are rendered more oxidatively stable by reaction with an antioxidant or stabilizer, generally a vinyl-group- or thiol group-containing antioxidant, in the presence of a free radical which may be produced by a redox system or ultra-violet light. The resulting polymers can be used as such or can be used as additives in other polymers to stabilize the latter.

11 Claims, No Drawings

PROCESS FOR PREPARING OXIDATIVELY-STABLE POLYMERS BY REACTION WITH ANTIOXIDANT IN THE PRESENCE OF FREE RADICAL

This invention refers to new oxidatively stable polymers and to methods of manufacturing them.

It is known that antioxidants and stabilisers are readily removed from polymers which come in contact with oils or are subjected to prolonged exposure to water as, for example, with vehicle tyres, or are subjected to washing in the presence of detergents as with, for example, rubber or polypropylene fibres, or are subjected to high temperatures during service, for example with seals or gaskets.

It has now been found, according to the present invention, that known antioxidants and stabilisers can be reacted with polymers in the presence of free-radicals. The process may be carried out either before the polymer is converted to a fabricated article, or it may be carried out on the fabricated article itself by treatment of the solid polymer with a solution of the antioxidant. The radical initiator may in this case be present either in the solution or in the polymer or it may be produced by the direct action of light on the polymer, preferably in the presence of a photosensitiser.

According to the present invention there is provided a process for preparing an oxidatively stable polymer which comprises reacting the polymer with an antioxidant or stabiliser in the presence of a free radical.

Any polymer containing hydrogen can be used in the process of this invention but those which contain carbon, hydrogen, oxygen and nitrogen are preferred, including, for example, polyolefins, polystyrene, polyvinylchloride, polyamides, polyesters, natural or synthetic rubbers, ethylene-propylene rubbers, styrene-butadiene, acrylonitrile-butadiene-styrene, polybutadiene, polyisoprene, polychloroprene, methacrylonitrile-butadiene-styrene and methyl methacrylate-butadiene-styrene copolymers, particularly in the form of latices. Of course, mixtures or blends of polymers can be used in which at least one contains hydrogen. The polymers will normally have a high molecular weight, for example such that the polymer is film- or fibre-forming, but low molecular weight polymers, for example polymers which are still liquid, may also be used when the adducts are to be used as additives for other polymers.

Any antioxidant or stabiliser may be used which gives rise to a free radical in the molecule. This may occur either by hydrogen abstraction or by addition of a free radical to an ethylenically unsaturated (e.g. vinyl or vinylidene) group which may be present in the molecule, especially those in which an unsaturated group is directly attached to an ester or amide group or an aromatic ring or an olefinic double bond.

The stabiliser may be, for example, a chain-breaking or peroxide-decomposing antioxidant, an ultraviolet screening agent, a triplet quencher or a metal deactivator. One skilled in the art will recognise that these terms have a definite meaning. For further details reference may be made to "Atmospheric Oxidation and Antioxidants", by G. Scott, Elsevier, 1965, in particular chapters 4 and 5 as well as "Polymer Stabilisation", ed. W. Lincoln Hawkins, Wiley-Interscience, 1972.

Examples of suitable chain-breaking antioxidants include phenols which give rise to a free radical in the presence of a hydrogen abstracting agent, for example those in which one aromatic position contains either a hydrogen atom, or an oxygen atom, a nitrogen atom, a sulphur atom or a carbon atom to each of which is attached at least one hydrogen. Specific examples of such phenols include the following:

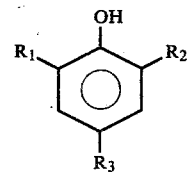

in which $R_1$ and $R_2$ each independently represents a hydrogen atom or tertiary alkyl radical such that at least one represents a tertiary alkyl radical and $R_3$ represents a hydrogen atom or an alkyl, hydroxy, hydroxyalkyl, alkoxyalkyl or mercaptoalkyl radical, particularly methyl, hydroxymethyl, methoxymethyl or mercaptomethyl radical. Specific examples include:

$R_1 = R_2 = tBu, R_3 = H$
$R_1 = tBu, R_2 = R_3 = Me$
$R_1 = R_2 = tBu, R_3 = -CH_2OH$
$R_1 = R_2 = tBu, R_3 = CH_2SH$
$R_1 = R_2 = tBu, R_3 = -CH_2OMe$
$R_1 = R_2 = tBu, R_3 = OH$, and
$R_1 = H, R_2 = tBu, R_3 = OH$ The tertiary alkyl radical is preferably tertiary butyl. Alternatively, $R_1 = R_2 = H$, $R_3 = NHR_4$ ($R_4 = H$, alkyl or aryl). These are strictly hindered or aromatic amine antioxidants which have a recognised meaning in this art. The radicals $R_1$, $R_2$, or $R_3$ may be substituted by, for example, aromatic phenolic or aromatic amine groups to give polynuclear phenols and amines such as:

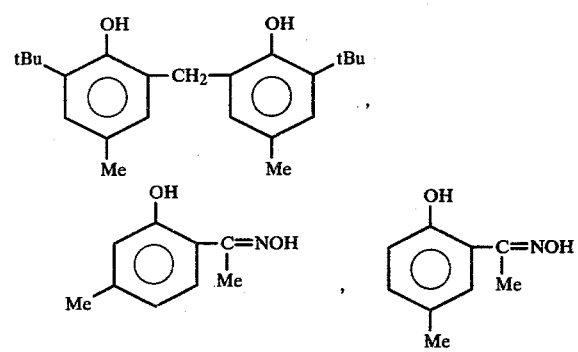

The methyl radicals can be replaced by, for example, other alkyl radicals or by substituted alkyl radicals e.g. —CH$_2$OH or —CH$_2$SH, or by hydrogen atoms.

Other chain-breaking antioxidants which may be used include polynuclear phenols in which the aromatic rings are connected through an atom other than carbon, for example:

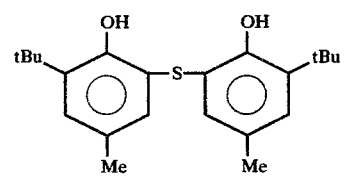

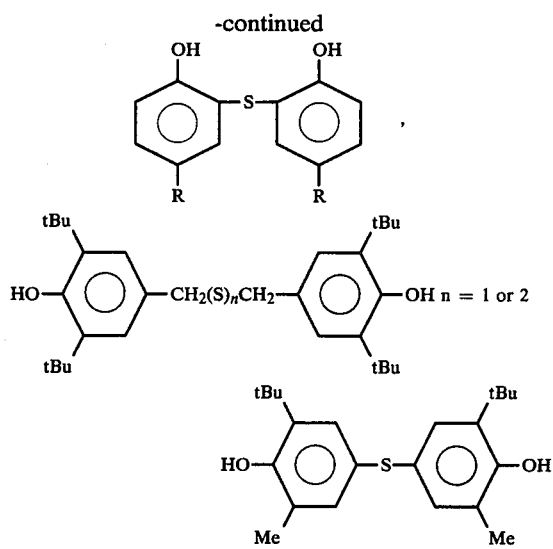

where R=alkyl, and aromatic amines having the structure

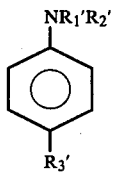

in which:
R'$_1$=R'$_2$=H, R'$_3$=H or
R'$_1$=R'$_2$=H, R'$_3$=arylamino or
R'$_1$=H, R'$_2$=alkyl, R'$_3$=H or
R'$_1$=H, R'$_2$=aryl, R'$_3$=H or
R'$_1$=H, R'$_2$=aryl, R'$_3$=mercaptoalkyl e.g. CH$_2$SH or
R'$_1$=H, R'$_2$=alkyl, R'$_3$=arylamino.

Examples of suitable U.V. absorbers include ortho-hydroxy benzophenones and ortho-hydroxyphenylbenzotriazoles, in which the hydroxy-containing ring is substituted by a thiol terminated group, such as:

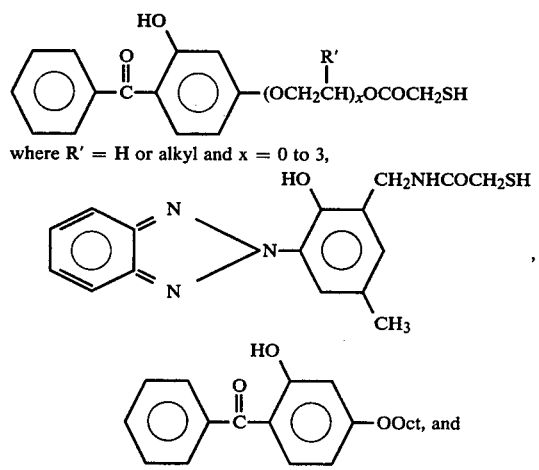

where R' = H or alkyl and x = 0 to 3,

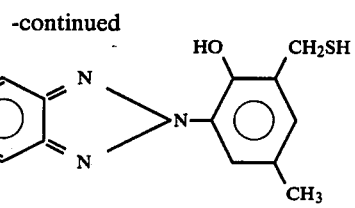

Many of the above phenols and amines form stable metal complexes particularly with nickel, cobalt and copper. These may also be used in the process of this invention to give bound U.V. stabilisers.

Examples of suitable unsaturated chain-breaking antioxidants include phenols, for example those of the formula:

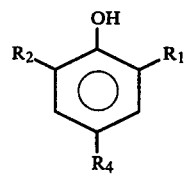

wherein each of R$_1$, R$_2$ and R$_4$ independently represents a hydrogen atom or a hydroxyl, alkoxy or hydrocarbon radical, for example an alkyl, aralkyl, aryl or alkaryl radical such that one of R$_1$, R$_2$ and R$_4$ represents a

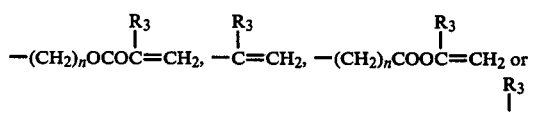

radical in which R$_3$ is as defined under R$_1$, R$_2$ and R$_4$ and n is 0 or an integer from 1 to 6. Preferably R$_1$ and/or R$_2$ is a tertiary alkyl radical; especially both R$_1$ and R$_2$ are tertiary.

Other ethylenically unsaturated phenols include those of the formulae:

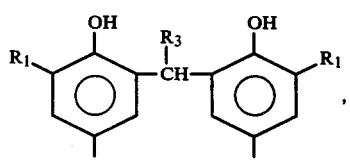

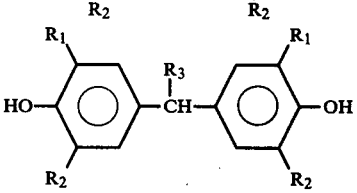

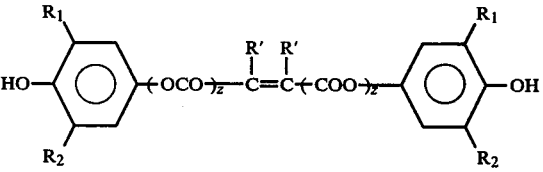

in which z is 0 or 1 and R', R$_1$, R$_2$ and R$_3$ are as defined above such that R$_3$ contains the polymerisable vinyl group.

Aromatic amines such as di(aryl)amines in which one of the aryl groups is a phenyl group substituted by a vinyl-terminated group such as:

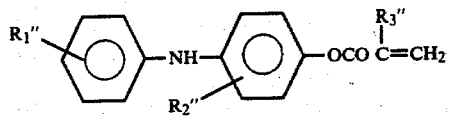

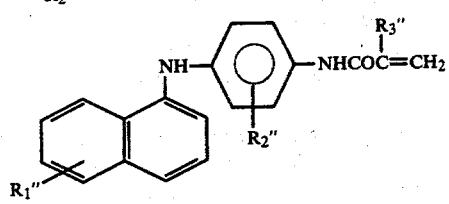

where each of $R''_1$, $R''_2$ and $R''_3$, which may be the same or different, represents a hydrogen atom or a hydroxyl, alkoxy, amino or hydrocarbon radical, for example an alkyl or aralkyl, alkaryl or aryl radical.

Examples of unsaturated peroxide-decomposing antioxidants which may be used include those of the formulae:

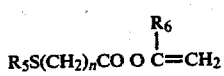

where each R may, independently, be alkyl, aryl or substituted alkyl or aryl and n may be 1 to 10;

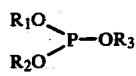

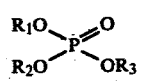

in which $R_1$, $R_2$ and $R_3$ are as defined above with the proviso that at least one of $R_1$, $R_2$ and $R_3$ contains a polymerisable vinyl group, for example:

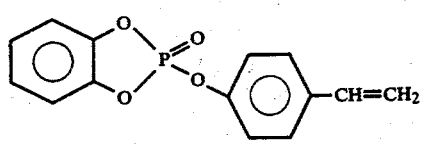

Examples of suitable unsaturated ultra-violet screening agents include those of the formulae:

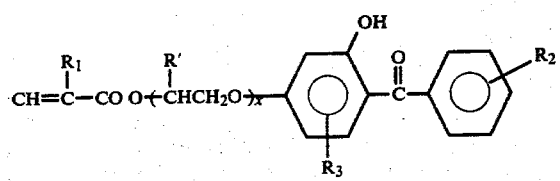

wherein $R_1$, $R_2$, $R_3$, $R'$ and x are as defined above and

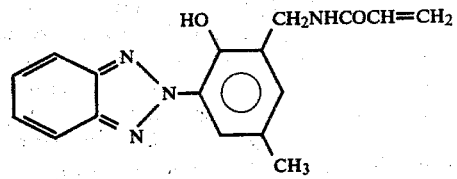

Examples of suitable unsaturated triplet quenching agents include nickel and cobalt complexes, such as those of the formula:

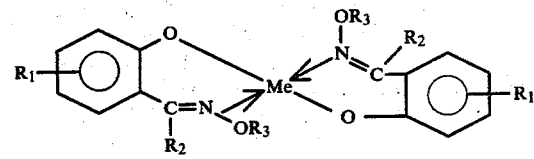

in which Me is nickel or cobalt and $R_1$, $R_2$ and $R_3$ are as defined above with the proviso that at least one contains a polymerisable vinyl group. As with the conventional antioxidants and stabilisers, more than one of the above-mentioned compounds may be used to produce a synergistic effect.

The process is particularly suitable for reacting antioxidants with polymers in aqueous emulsions and latices, especially those containing a high stabiliser concentration. Polymers produced in this way may be used as additives for conventional latices. Under these conditions, for example in natural or synthetic rubber latices, redox radical generating systems are particularly convenient. Such systems include a mixture of hydroperoxide and a polyamine, persulphate and a reducing agent and similar systems which have been used previously to induce emulsion polymerisation. In effect, any compound which dissociates to give free radicals at temperatures generally below about 120° C., or any reaction which gives free radicals can be used. In general it is preferred to use redox systems with vinyl-group containing antioxidants since these prefer the presence of oxidising or alkoxy radicals while thiol antioxidants prefer the presence of reducing or alkyl radicals which are formed in azo systems such as azobisisobutyronitrile. Other alkyl radical forming systems which can also sometimes be used are mechanochemical procedures used during processing. For example mastication can be used with polyethylene without it being necessary to add a free-radical generator.

It will be appreciated that the generator should suitably be such that it is dissociated substantially completely at the end of the reaction since otherwise residual generator may react with the subsequent polymer undesirably; for example residual generator may cure the polymer when this is not desired. In other words the generator is added to the antioxidant and when this function is fulfilled it should not affect the polymer further.

The optimum activity of the bound antioxidant depends on the ratio of antioxidant or stabiliser to initiator. This varies with the antioxidant, the polymer and the type of initiator system used. However the weight ratio is normally from 100:1 to 0.25:1 especially 10:1 to 0.25:1; the range 20:1 to 0.5:1 especially 5:1 to 0.5:1 is preferred in the case of redox initiators.

When the antioxidant is used to modify the properties of the polymer it will generally be added in an amount from 0.1 to 5 or 10%, typically 0.25 to 3%, more usually 0.5 to 2%, by weight based on the weight of the polymer. When, on the other hand, the antioxidant is added to form an adduct which can be used to modify the properties of another polymer larger quantities can be used. When the antioxidant is a thiol it is possible to use as much as 300 to 500% by weight; when the antioxidant is not a thiol amounts up to 10 to 15% by weight are generally preferred.

The temperature at which reaction is carried out will naturally depend on the radical concentration in the medium. In general temperatures from 0° to 200° C. will be suitable although temperatures from 50° to 120° or 130° C. will normally be preferred since above the upper end of this temperature range undesirable secondary reactions may occur; indeed with a latex system it is desirable not to exceed about 100° C., a suitable temperature range generally being 40° to 60° C. Below the preferred temperature range uneconomically long reaction times or uneconomical amounts of initiator may be required. In chemico-mechanical processes where no initiator is present the temperature used will depend largely on the nature of the polymer; for low density polyethylene a temperature of the order of 150° C. is generally suitable.

This procedure provides a very convenient way of producing a rubber-bound antioxidant by direct grafting during manufacture, either in the latex or in organic solution or suspension. Lattices containing a high stabiliser concentration produced in this way may be used as additives for conventional latices; the resulting solid polymers produced may also be used as additives to confer oxidative stability on other polymers.

Another method involves initiation with ultraviolet light, preferably using photoactivators which lead to hydrogen abstraction via an energetic species, for example the triplet carbonyl from benzophenone. This method is particularly suitable for the grafting of hindered phenols. In the case where a photosensitiser (for example benzophenone) is used, the optimum ratio of antioxidant to photosensitiser depends on the polymer, the antioxidant and the photosensitiser but it is normally in the range from 20:1 to 0.5:1. The range 10:1 to 1:1 is preferred.

It is also possible to carry out the grafting reaction in two stages. The first stage involves building hydroperoxides into the polymer, for example by prior oxidation, followed by using the hydroperoxide as a built-in grafting initiator in the presence of U.V. light or a reducing agent (e.g. $SO_2$).

A particular advantage of the surface grafting process is that it can be carried out on a previously fabricated article, for example as fibres or films; the effect of such a process is to concentrate the antioxidant or stabiliser on the surface of the article where it is likely to be most effective.

In general it is advantageous to exclude oxygen from the reactions described above; however in the case of some ethylenically unsaturated compounds it has been found that the presence of oxygen in small amounts, for example oxygen present as impurity in commercial grade nitrogen, leads to a more even distribution of the stabiliser in the polymer.

As with conventional antioxidants and stabilisers, more than one of the above mentioned compounds may be reacted together with the polymer to give bound synergistic stabiliser systems.

It is preferred that if the antioxidant is a saturated thiol that it is reacted with an unsaturated polymer. However it has been found that the use of such antioxidant can be particularly useful with essentially saturated polymers which contain some residual unsaturation remaining from unsaturated monomer starting material, as with certain types of low density polyethylene for example. The reaction with the thiol can be carried out with such polymers either by pretreatment of the powder or by post-treatment of the final article but preferably by treatment during processing in the presence of a free radical catalyst such as azobisisobutyronitrile.

The following Examples further illustrate the present invention.

EXAMPLE 1

6 cm$^2$ of polypropylene film (thickness 100 μm) was irradiated with a U.V. lamp radiating light of wavelength above 250 nm in excess of a solution of 2.5 g of 3,5-ditert-butyl-4-hydroxybenzyl acrylate (DBBA) and 1 g of benzophenone in 100 cc. of benzene for 90 hours. The resulting film which appeared unchanged was Soxhlet extracted for 48 hours in acetone which is a solvent for the monomer. The film was oxidised in oxygen in a closed system at 120° C.; the induction period to the beginning of oxygen absorption was found to be 550 hours. The concentration of antioxidant in the film was found by U.V. absorption spectrophotometry to be 0.092%. 0.1% of the same antioxidant was incorporated into polypropylene by a conventional compounding technique—the polypropylene powder was treated with a solution of the antioxidant and the solvent removed and the resulting powder was then compression-moulded to film of the required thickness. After acetone extraction the induction period was found to be 2 hours. A well known commercial antioxidant for polypropylene, Irganox 1076, at the same concentration, was found, after extraction, to give an induction period of 2 hours.

The benzene solution of vinyl antioxidant could be used many times before the antioxidant had been depleted sufficiently to affect the induction period significantly.

EXAMPLES 2-6

The procedure of Example 1 was repeated except that the concentration of benzophenone in the solution was varied.

|  | Benzophenone concn. | Monomer/Benzophenone ratios | Induction Period |
|---|---|---|---|
| Example 2 | 0 | — | 16 |
| Example 3 | 0.1 | 15.7 | 215 |
| Example 4 | 0.5 | 3.14 | 330 |
| Example 5 | 1.7 | 0.92 | 220 |
| Example 6 | 5.0 | 0.314 | 66 |

This shows that although grafting does occur in the absence of benzophenone, the presence of the activator promotes the process and there is an optimum ratio, which is between 15.7:1 and 0.92:1, for the production of the most effective graft.

EXAMPLES 7–12

The conditions of Example 1 were followed except that 5% of monomer and 1% benzophenone were used and the irradiation time was varied.

|  | Irradiation time (hrs) | Induction period (hrs) |
|---|---|---|
| Example 7 | 24 | 50 |
| Example 8 | 36 | 73 |
| Example 9 | 45 | 110 |
| Example 10 | 70 | 140 |
| Example 11 | 90 | 366 |
| Example 12 | 126 | 87 |

Again optimum grafting is evident; however very powerfully stabilised polymers can be obtained at quite short irradiation times. A similar variation can be shown by varying the lamp intensity.

EXAMPLE 13

The U.V. stability of polypropylene grafted with DBBA as in Example 1 was compared with that of unstabilised polypropylene and polypropylene containing DBBA incorporated as an additive during fabrication in the usual way.

|  | Time to embrittlement (hrs) |
|---|---|
| Polypropylene (unstabilised) | 63 |
| Polypropylene containing 0.1% DBBA | 86 |
| Polypropylene grafted with 0.092% DBBA | 158 |

This illustrates the effect of concentrating the stabiliser on the surface of the polymer and contrasts with the marginal U.V.-stabilising effect of incorporating antioxidant in a conventional manner.

EXAMPLE 14

10 parts of DBBA was ballmilled with 50 parts of water containing 0.5 parts of Dispersol LN for 3 hours. After removal of the balls the volume was made up to 100 parts with water.

166 parts of commercial centrifuged natural rubber latex stabilised with 0.5% of ammonia (dry rubber content, 60.0%) was stirred in a nitrogen atmosphere at 40° C. and a sufficient amount of the above dispersion was added to give 2% concentration based on the solid rubber content. To this dispersion was added 1.5 parts of commercial (70%) tert-butyl hydroperoxide and 5 parts of a 10% aqueous solution of tetraethylene pentamine (TEP). The reaction was performed at 40° C., for 24 hours and the rubber was coagulated by adding it to a 1% solution of formic acid. The coagulum was washed with water and sheeted out to pale crepe on a rubber mill.

The dried pale crepe was divided into two parts. The first part was vulcanised in the usual way at 140° C., for 30 minutes using the following formulation:

|  | Parts by weight |
|---|---|
| Grafted natural rubber | 100 |
| Zinc oxide | 5 |
| Sulphur | 2.5 |
| Stearic acid | 3 |
| CBS | 0.5 |

The second sample was Soxhlet extracted under nitrogen for 72 hours and after drying was vulcanised in the same way.

Samples of the vulcanised rubber were examined by oxygen absorption and were compared with a sample of normal rubber from the same latex coagulated and cured in the same way. The results are given in the following Table.

TABLE

| Oxidation times at 70° C. (hrs.) | Control No antioxidant | Oxygen absorbed (arbitrary units) Samples containing anti-oxidant | |
|---|---|---|---|
|  |  | Unextracted | Extracted |
| 20 | 3 | 1.0 | 1.5 |
| 40 | 12 | 1.75 | 3.0 |
| 60 | 29 | 2.5 | 4.0 |
| 80 | 60 | 3.0 | 5.5 |
| 100 | Very large | 4.0 | 6.5 |
| 120 | Very large | 5.0 | 8.0 |
| 140 | Very large | 6.0 | 9.9 |

It is clear from this experiment that the grafted rubber contains a very powerful antioxidant which is removed only to a very small extent by an efficient extracting agent.

EXAMPLES 15–17

The following compounds were used as antioxidants:
A (3,methyl-5-tert-butyl-4-hydroxy)benzyl acrylate
B (3,5-di-tert-butyl-4-hydroxy)phenyl acrylate
C (4-phenylamino)-N-phenyl acrylamide They were each grafted into natural rubber latex by the method of Example 14 except that 3 ml of TEP was added and the reaction was carried out at 50°–60° C., in a nitrogen atmosphere. The rubber was coagulated, washed, dried, vulcanised as in Example 14 and the vulcanisates, after extraction with acetone, were submitted to the oxygen absorption test at 70° C. The times taken to absorb 1% and 5% (by weight) of oxygen are listed in the Table.

| Antioxidant |  | Time taken to absorb oxygen (hrs) | |
|---|---|---|---|
|  |  | 1% | 5% |
| Example 15 A |  | 90 | 380 |
| Example 16 B | Grafted | 68 | 300 |
| Example 17 C |  | 35 | 150 |
| None |  | 15 | 42 |

When these antioxidants were evaluated in the same way but omitting the grafting process the oxygen absorption curves were substantially similar to the control indicating that, unlike the grafted antioxidants, the ungrafted antioxidants were extracted completely. The above results show that the grafting method is generally applicable to acrylate esters containing an antioxidant function.

EXAMPLE 18

To a mixture of 25.8 g of vinyl acetate and 13.9 g of 3,5-di-tert-butyl 4-hydroxy propionic acid was added 0.203 g of mercuric acetate and, slowly, 0.203 g of concentrated sulphuric acid.

The mixture was stirred at 60°–65° C. for 15 hours and 2 g of sodium acetate was added. The product, vinyl(3,5-di-tert-butyl-4-hydroxy phenyl)propionate was isolated in 70% yield by vacuum distillation. Mpt=60°–62° C. (Antioxidant D).

This antioxidant was grafted to natural rubber latex (2 parts per hundred of rubber) by the method of Example 14 and when vulcanised and evaluated in the same way it was found to give the following oxygen absorption characteristics.

| Antioxidant | Time to absorb oxygen (hrs) | |
|---|---|---|
| | 1% | 5% |
| None | 15 | 42 |
| Antioxidant D | 25 | 105 |

EXAMPLE 19

10 g of 4-benzoyl-3-hydroxyphenyl acrylate (BHPA) and 0.5 g of Dispersol LN were ball milled for 4 hours with enough water just to cover the balls. The dispersion produced was stable and was added to a commercial polybutadiene latex in an amount such as to give a concentration on a dry rubber basis of 2% by weight. To 170 g of the latex was added 0.35 g of potassium persulphate and 0.73 g of sodium stearate and the mixture was heated with stirring at 45° C., in nitrogen for 24 hours. To this mixture was then added 73 g of styrene and 36 g of acrylonitrile followed by 0.34 g of potassium persulphate and 0.72 g of sodium stearate. The latex was then heated for a further 16 hours in nitrogen at 45° C. The copolymer was coagulated by adding 200 cc. of 75% formic acid and the coagulate was filtered, washed neutral with water and then ethanol, and dried. The resulting ABS crumb was Soxhlet extracted for 24 hours with acetone to remove non-grafted stabiliser. After drying at 50° C., for 6 hours the polymer was pressed to films of thickness 0.09 mm between sheets of cellophane at 190° C., for 1½ minutes using a pressure of 132 MN m$^{-1}$. The films were cooled to 40° C., under pressure and on removal from the press were soaked for 5 minutes in methanol to facilitate removal of the cellophane. The samples were exposed to U.V. light with a fluorescent sun-lamp/black-lamp (280 nm) which simulated sunlight and the carbonyl concentration was measured at intervals. The first order rate constant for carbonyl formation (k) and the time to embrittlement were measured and compared with similar samples containing no U.V. stabiliser. The results are given below.

| | k ($\times 10^5$) | Embrittlement time (hrs) |
|---|---|---|
| Unstabilised ABS | 8.41 | 53 |
| BHPA (grafted) | 3.62 | 92 |

EXAMPLE 20

Example 19 was repeated except that the styrene and acrylonitrile were added immediately after the BHPA and the grafting reaction was carried out for only 16 hours. The unstabilised polymer and polymer containing a conventional u.v. stabiliser (u.v. 531) were reacted in the same way as the vinyl stabiliser but without the extraction process. The samples were compared with the grafted system.

| | k ($\times 10^5$) | Embrittlement time |
|---|---|---|
| Unstabilised ABS | 8.41 | 53 |
| BHPA (Grafted) | 1.99 | 126 |
| U.V. 531 | 4.61 | 93 |

EXAMPLE 21

Example 20 was repeated except that half of the BHPA was replaced by an equivalent weight of DBBA, and the grafting catalyst was tert-butyl hydroperoxide and tetraethylene pentamine as described in Example 14. Embrittlement time was measured and was found to be 175 hours. This compares directly with the results given in Example 20 and illustrates synergistic effects which can be obtained between different kinds of bound stabiliser.

EXAMPLE 22

Example 14 was repeated except that enough antioxidant was added to give 8% concentration on the final rubber. The grafting was carried out using 4.5 parts of tert-butyl hydroperoxide and 12 parts of 10% TEP solution. Half of the latex was coagulated, vulcanised and extracted as in Example 14 and the remainder was added at a ratio of 1 to 3 parts to normal latex and the resulting latex treated in the same way. The oxygen absorption results on the extracted vulcanisates are compared in the Table below with a typical unextracted CBS vulcanisate from the same untreated latex.

| Oxidation Time at 70° C. (hrs.) | Control (unextracted) No antioxidant | Oxygen absorbed (arbitrary units) Samples containing grafted antioxidant (extracted) | |
|---|---|---|---|
| | | 8% | 2% |
| 20 | 4.5 | 1.0 | 2.3 |
| 40 | 26.0 | 2.0 | 3.6 |
| 60 | very high | 2.5 | 4.6 |
| 80 | " | 3.0 | 6.0 |
| 100 | " | 4.5 | 7.2 |
| 120 | " | 6.0 | 9.2 |
| 140 | " | 7.0 | 11.0 |

This experiment demonstatres that pre-grafted antioxidant concentrates when added to normal latex give rise to an effective polymer bound antioxidant in the final vulcanisate.

EXAMPLE 23

22.5 g of 2(2'-hydroxy-5'-methylphenyl)-benzotriazole were dissolved in 75 ml of concentrated H$_2$SO$_4$ and the solution cooled to 5°–10° C. 10.1 g of N-methylolacrylamide was added slowly. After stirring at 20° C. for 2 hours the reaction mixture was poured onto ice. The product was washed with water and recrystallised from ethylene glycol monomethyl ether to give 2-(2'-hydroxy-3'-acrylolamidomethyl-5'-methylphenyl)-benzotriazole, (Mpt 197°–8° C.).

The benzotriazole U.V. stabiliser was dispersed in water by the method of Example 14 and enough of the dispersion was added to polybutadiene latex to give 2% weight concentration on the weight of rubber. The additive was then grafted by the method of Example 19 except that the styrene and acrylonitrile were omitted. The embrittlement time was compared to that of a control in which the procedure was identical except that the grafting procedure was omitted. The results are given in the Table.

|  | Embrittlement time (hrs) |
|---|---|
| No stabiliser | 276 |
| Stabiliser grafted | 360 |
| Stabiliser not grafted | 270 |

EXAMPLE 24

The conditions of Example 23 were repeated except that in addition the antioxidant dispersion of Example 14 was also added (2% w/w based on the polybutadiene). The time to embrittlement was 450 hours.

EXAMPLE 25

Commercial low density polyethylene was melt-mixed at 165° C., for 30 minutes in the presence of air. The polymer was then compression moulded to film of thickness $8 \times 10^{-3}$ ins and the resulting film was immersed in a 10% $CCl_4$ solution of BHPA containing a low concentration (1%) of sulphur dioxide. After 10 minutes, the film was removed and washed with acetone to remove unreacted stabiliser. The film was analysed for carbonyl by infra-red spectrophotometry and the concentration of bound stabiliser was found to be 0.25%. The film was irradiated in a fluorescent sun-lamp/black lamp and the lifetime of the film was found to be increased by 50% over that of a control sample made from film processed and compression moulded normally.

This Example illustrates the way in which hydroperoxides bound to the polymer can be used in a redox reaction to initiate grafting.

EXAMPLES 26–28

2,6-di-tert-butyl-4-methylphenol (TBC), 3,5-di-tert-butyl-4-hydroxy benzyl alcohol (DBB) and 2,6-di-tert-butyl hydroquinone (DBH) were dispersed in water as in Example 14 and sufficient were added to natural rubber latex in three separate experiments to give 2% on the dry rubber content in each case. To these latices was added in each case tert-butyl hydroperoxide (TBHP; 0.75 g/g of antioxidant) and tetraethylene pentamine (TEP; 2 ml. of 10% solution g of antioxidant) and the mixture reacted at 40° C., for 24 hours in an atmosphere of nitrogen. The rubber samples were coagulated with formic acid, washed, dried and extracted with acetone as in Example 14.

The rubbers were vulcanised as in Example 14 and the sheets wre subjected to oxygen absorption and the results obtained, compared with a control containing no antioxidant are given in the Table:

| Oxidation time at 70° C. (hrs) | Control (no anti-oxidant) | Oxygen absorbed (arbitrary units) | | |
|---|---|---|---|---|
| | | TBC | DBB | DBH |
| 40 | 12 | 3.0 | 1.0 | 1.5 |
| 80 | 60 | 6.0 | 1.8 | 3.0 |
| 120 | Very large | 10.0 | 3.5 | 4.5 |

-continued

| Oxidation time at 70° C. (hrs) | Control (no anti-oxidant) | Oxygen absorbed (arbitrary units) | | |
|---|---|---|---|---|
| | | TBC | DBB | DBH |
| 140 | " | 11.0 | 4.0 | 6.0 |

EXAMPLE 29

To 50 cc of ammoniated latex (25% based on dry rubber) was added 1% of Vulcastab C paste (a commercial non-ionic dispersing agent) at 80° C. in nitrogen. 5 gms of 3,5-di-tertbutyl-4-hydroxybenzyl mercaptan (Mpt 31° C.) prepared by the method described in British Specification No. 911,958, and 0.1 gms of azo-bis-isobutyronitrile were added followed by 200 cc of distilled water. After stirring for 24 hours, aliquots of the reaction product were added to 50 cc quantities of 50% latex to give varying concentrations of antioxidant in the latex; then the mixtures were coagulated with 2% formic acid. In each case the crepes were extracted with an azeotrope of acetone, methanol and trichloroethane for a period of 24 hours in nitrogen. All the sheets were then dried in vacuo at 40° C. for 24 hours and vulcanised at 140° C. for 30 minutes in thin sheets using the following formulation:

| Rubber | 100 g |
|---|---|
| Stearic acid | 1.0 g |
| Zinc oxide | 5.0 g |
| N-Cyclohexylbenthiazyl sulphonamide (CBS) | 0.5 g |
| Sulphur | 2.5 g |

The additives were found to have no noticeable effect on vulcanisation. The colour of the dried coagulated latex was, however, found to be much less than the rubber containing no antioxidant, a result of considerable commercial importance.

By using infra-red spectrophotometry to measure the concentration of phenolic oxygen in the rubber, the concentration of the antioxidant present in the rubbers after vulcanisation and extraction could be measured. The actual concentrations measured are given in the following Table; the length of time to absorb 0.5% and 1% of oxygen of the extracted vulcanisates at 80° C. is also given.

| | Concentration % | Time (in hours to absorb $O_2$) | |
|---|---|---|---|
| | | 0.5% | 1% |
| 1. No additive | 0 | 17 | 25 |
| 2. 10 cc antioxidant-bound latex | 0.25 | 24 | 36 |
| 3. 25 cc antioxidant-bound latex | 0.625 | 43 | 53 |
| 4. 50 cc antioxidant-bound latex | 1.25 | 60 | 125 |

EXAMPLE 30

To 66 gms of polybutadiene latex (35% w/w) was added with stirring at 55° C. 0.73 gms of sodium stearate dissolved in 75 cc of distilled water. 5 gms of 1-chloromethyl-2-(3-hydroxy-4-benzoylphenyl)ethylthio-glycollate in 15 gms of toluene were added over 30 minutes followed by 0.01 gm of azobis-isobutyronitrile whilst nitrogen was passed through the mixture. After 4 hours the toluene was removed and the reaction continued for a further 6 hours. Then the latex was coagulated, washed, dried and extracted with ethane followed by diethyl ether to remove any unreacted u.v. stabiliser. Sulphur analysis of the dried rubber showed that the u.v. stabiliser had been quantitatively reacted with the rubber.

The latex made in this way was added to polybutadiene (35% w/w) to give 2% by weight on the dry rubber and the resulting modified latex was then converted to ABS by the method of Example 19. The u.v. stability of the resulting resin was very much better (60% or more) than that of a control sample containing 2% of a commercial benzophenone u.v. stabiliser (u.v. 531) made by a conventional compounding technique, particularly after solvent extraction.

EXAMPLE 31

Low density polyethylene containing 0.5 weight percent of 3,5-di-tert-butylbenzyl-mercaptan was heated in a high shear mixer for 15 minutes at 150° C. in the absence of air. Film fabricated from this polymer was found after extraction to contain a small concentration ($\approx 0.1\%$) of bound phenolic antioxidant; its thermal oxidative and u.v. stability was found to have increased by a factor of 80%, even after extraction, compared with a normally processed sample. This Example illustrates the effect of radicals, initiated by shear, on the binding of antioxidants with polyethylene.

EXAMPLES 32–36

The following antioxidants were reacted with natural rubber latex by the method of Example 14 in an amount equivalent to 2% by weight of antioxidant on the dry rubber content.

| Example 32 | N-4-(phenylaminophenyl)acrylamide |
| Example 33 | 4-isopropylaminodiphenylamine |
| Example 34 | 2,2'-methylene-bis(4-methyl-6-tert-butylphenol) |
| Example 35 | 2,4-dimethyl-6-tert-butylphenol (TEX) |
| Example 36 | 2,6-di-tert-butyl-4-hydroxymethyl phenol |

The oxygen absorption characteristics of the cured rubbers after extraction are shown in the following table.

TABLE

| Example | Time to 2% oxygen absorption (hrs at 70° C.) |
| --- | --- |
| Control | 22 |
| 32 | 130 |
| 33 | 55 |
| 34 | 42 |
| 35 | 150 |
| 36 | 105 |

Examples 32, 35 and 36 were also evaluated by stress relaxation at 100° C. in a stream of air. The results given in the following table show that the bound samples are very much more effective than the sample obtained by incorporating TBX normally.

| Example | Time (hrs) to fog f/fo = 1.0 |
| --- | --- |
| Control (no antioxdant) | 7.0 |
| 32 | 9.5 |
| 35 | 32.0 |
| 36 | 14.0 |
| TBX incorporated | 7.5 |

| Example | Time (hrs) to fog f/fo = 1.0 |
| --- | --- |
| normally | |

EXAMPLE 37

Natural rubber latex (25% w/w) was treated with a dispersion of (TBX) in the presence of TBHP/TEP as described in Examples 26 to 28 to give 2% by weight of antioxidant based on dry rubber content. This mixture was then added to a normal latex in the ratios 1:1 and 2:1 to give latics with 1% and 0.5% by weight antioxidant respectively.

The rubbers were coagulated, washed, dried, extracted and vulcanised as in Example 14. The results of oxygen absorption tests on these rubbers and on the organic undiluted sample are given below:

| Oxidation time at 70° C.(hrs). | Oxygen absorbed arbitrary units TBX (%) | | |
| --- | --- | --- | --- |
| | Control (no antioxidant) | 2 | 1 | 0.5 |
| 40 | 8 | 1.0 | 1.5 | 2.5 |
| 80 | 50 | 3.0 | 3.5 | 5.5 |
| 120 | very large | 3.5 | 5.0 | 10.0 |
| 140 | very large | 5.0 | 5.5 | 12.0 |

In separate experiments these rubbers were also compared with rubber containing TBX incorporated in a conventional way in the oxygen absorption test after repeated extraction by aqueous detergents. It was found that the latter oxidised at a similar rate to the control after three extractions whereas all the antioxidant bound rubbers were little affected after 15 extractions.

EXAMPLE 38

The process of Example 14 was repeated except that the TBHP/TEP radical generator was replaced by potassium persulphate (1.5 g), azo-bis-isobutyronitrile, (AZBN:0.5 g) and benzoyl peroxide (Bz$_2$O$_2$:0.5 g). Grafting was carried out at 50° C. The results obtained by extracting the rubbers before vulcanisation are given below:

| Initiator | Time to absorb 3% O$_2$ (hrs at 70° C.) |
| --- | --- |
| K$_2$S$_2$O$_8$ | 48 |
| AZBN | 38 |
| Bz$_2$O$_2$ | 42 |
| None | 10 |

EXAMPLES 39–40

1% (Example 39) and 2% (Example 40) of DBBA were mixed into natural rubber in an efficient shearing mixture for 10 minutes at 40° C. The rubbers were divided into two parts. The first was compression moulded to sheet and extracted, dried and vulcanised as in Example 14. The second was vulcanised without extraction. The vulcanisates were evaluated by the oxygen absorption technique in the usual way.

| Example | | Time (hrs) to absorb oxygen | |
|---|---|---|---|
| 39 | unextracted | 2% 75 | 4% 160 |
| 40 | | 75 | 160 |
| control | | 20 | 30 |
| 39 | extracted | 25 | 45 |
| 40 | | 65 | 85 |
| control | | 5 | 10 |

What I claim is:

1. A process for preparing an oxidatively stable polymer which comprises reacting the polymer with an antioxidant of the formula:

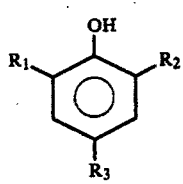

in which $R_1$ and $R_2$ each independently represents a hydrogen atom or a tertiary alkyl radical such that at least one represents a tertiary alkyl radical and $R_3$ represents a hydrogen atom or an alkyl, hydroxy, hydroxyalkyl, alkoxyalkyl or mercaptoalkyl radical, said R radicals optionally being substituted by aromatic phenolic or aromatic amine groups, in the presence of a free radical with the proviso that when the free radical is produced by a free radical generator, said generator produces free radicals at a temperature below about 120° C.

2. A process according to claim 1 in which the polymer is reacted as an aqueous emulsion or latex.

3. A process according to claim 1 in which the polymer is ethylenically unsaturated.

4. A process according to claim 1 which is carried out in the absence of oxygen.

5. A process according to claim 1 in which the tertiary alkyl radical is a tertiary butyl radical.

6. A process according to claim 5 in which the antioxidant is 3,5-di-tert-butyl-4-hydroxybenzylmercaptan.

7. A polymer composition which comprises a polymer and an oxidatively stable polymer obtained by a process as defined in claim 1.

8. A process according to claim 1 in which the free raidcal is produced by a redox system.

9. A process according to claim 1 in which the free radical is produced by an azo system.

10. A process according to claim 1 in which the free radical is produced by ultra-violet light activation.

11. A process according to claim 1 in which the polymer is a polyethylene containing residual unsaturation and the antioxidant is a thiol-containing antioxidant.

* * * * *